(12) United States Patent
Okamoto et al.

(10) Patent No.: US 6,867,280 B2
(45) Date of Patent: Mar. 15, 2005

(54) PROCESS FOR PRODUCING AROMATIC LIQUID CRYSTAL POLYESTER

(75) Inventors: Satoshi Okamoto, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 271 days.

(21) Appl. No.: 10/046,302

(22) Filed: Jan. 16, 2002

(65) Prior Publication Data

US 2002/0143135 A1 Oct. 3, 2002

(30) Foreign Application Priority Data

Jan. 26, 2001 (JP) ......................................... 2001-018326

(51) Int. Cl.$^7$ ............................................. C08G 63/02
(52) U.S. Cl. ....................... 528/271; 528/176; 528/190; 528/193; 528/272
(58) Field of Search ................................. 528/176, 190, 528/193, 271, 272

(56) References Cited

FOREIGN PATENT DOCUMENTS

| JP | 63-245435 | 10/1988 |
| JP | 2-311526 | 12/1990 |
| JP | 0790067 A | * 4/1995 |

* cited by examiner

Primary Examiner—Terressa M. Boykin
(74) Attorney, Agent, or Firm—Birch, Stewart, Kolasch & Birch, LLP

(57) ABSTRACT

A process for producing an aromatic liquid crystal polyester comprising reacting an aromatic diol, an aromatic hydroxycarboxylic acid, or an aromatic diol and aromatic hydroxycarboxylic acid with an aromatic dicarboxylic acid in the presence of a fatty anhydride having carbon atoms of 4 or less and a fatty anhydride having carbon atoms of over 4.

6 Claims, 1 Drawing Sheet

PROCESS FOR PRODUCING AROMATIC LIQUID CRYSTAL POLYESTER

BACKGROUND OF THE INVENTION

1. Field of the Invention

The present invention relates to an aromatic liquid crystal polyester and a process for producing the same.

2. Description of Related Arts

Liquid crystalline polyesters (aromatic liquid crystal polyester) comprising an aromatic ring skeleton are used recently in the electric and electronic fields as high performance materials excellent in mechanical properties such as strength, elastic modulus and the like, and in heat resistance.

As the process for producing an aromatic liquid crystal polyester, the following processes (1) and (2) are known using an aromatic hydroxycarboxylic acid such as p-hydroxybenzoic acid and the like, an aromatic diol such as 4,4'-hydroxybiphenyl and the like and an aromatic dicarboxylic acid such as terephthalic acid and the like, and acetic anhydride as an acylating agent.

(1) A process in which a phenolic hydroxyl group in an aromatic diol and/or aromatic hydroxycarboxylic acid is acylated with acetic anhydride to obtain an acylated compound, and this acylated compound is allowed to react with a carboxyl group in an aromatic dicarboxylic acid and/or aromatic hydroxycarboxylic acid by a transesterification reaction.

(2) A process in which an aromatic diol and/or aromatic hydroxycarboxylic acid are reacted with an aromatic dicarboxylic acid in the presence of acetic anhydride to effect the acylation reaction and transesterification reaction in the process (1).

SUMMARY OF THE INVENTION

In the processes as described above using acetic anhydride as an acylating agent in acylating a phenolic hydroxyl group, an aromatic liquid crystal polyester produced is excellent in heat resistance and strength, however, a thin wall molding ability of a resin is not sufficiently satisfactory.

An object of the present invention is to solve the above-mentioned problem and to provide a process for producing an aromatic liquid crystal polyester excellent in a thin wall molding ability while maintaining the characteristics of the aromatic liquid crystal polyester such as excellent heat resistance and strength.

The present inventors have intensively studied to solve the above-mentioned problems, and resultantly found that an aromatic liquid crystal polyester excellent in a thin wall molding ability can be obtained by using a fatty anhydride having carbon atoms of 4 or less and a fatty anhydride having carbon atoms of over 4 as an acylating agent, and have completed the present invention.

Namely, the present invention relates to a process for producing an aromatic liquid crystal polyester comprising reacting an aromatic diol, an aromatic hydroxycarboxylic acid, or an aromatic diol and aromatic hydroxycarboxylic acid with an aromatic dicarboxylic acid in the presence of a fatty anhydride having carbon atoms of 4 or less and a fatty anhydride having carbon atoms of over 4.

Figure 1:
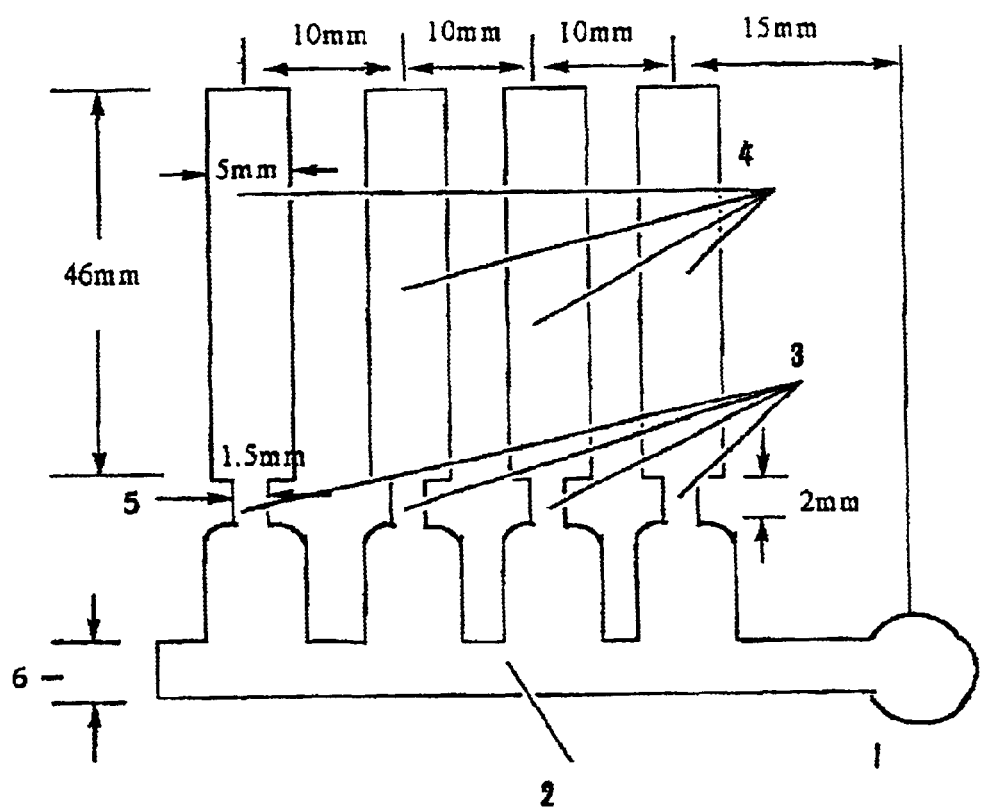
FIG. 1 is a sectional view of a mold for measuring thin wall flow length. A molded article obtained by this mold has a thickness of 0.3 mm.

1. Sprue
2. Runner (Φ4.0 mm)
3. Gate (0.3 t×1.5 w×2.01)
4. Cavity.
5. Gate thickness
6. Runner diameter

DETAILED DESCRIPTION OF THE PREFERRED EMBODIMENTS

In the production process of the present invention, disclosed as examples of the aromatic diol are 4,4'-dihydroxybiphenyl (hereinafter, abbreviated as (C1) in some cases), hydroquinone (hereinafter, abbreviated as (C2) in some cases), resorcinol (hereinafter, abbreviated as (C3) in some cases), methylhydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene (hereinafter, abbreviated as (C4) in some cases), 2,7-dihydroxynaphthalene, 2,2-bis(4-hydroxyphenyl)propane (hereinafter, abbreviated as (C5) in some cases), 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis-(4-hydroxyphenyl)methane, bis-(4-hydroxy-3,5-dimethylphenyl)methane, bis-(4-hydroxy-3,5-dichlorophenyl)methane, bis-(4-hydroxy-3,5-dibromophenyl)methane, bis-(4-hydroxy-3-methylphenyl)methane, bis-(4-hydroxy-3-chlorophenyl)methane, 1,1-bis-(4-hydroxyphenyl)cyclohexane, bis-(4-hydroxyphenyl)ketone, bis-(4-hydroxy-3,5-dimethylphenyl)ketone, bis-(4-hydroxy-3,5-dichlorophenyl)ketone, bis-(4-hydroxyphenyl)sulfide, bis-(4-hydroxyphenyl)sulfone and the like. These can be used alone or in combination of two or more. Among them, 4,4'-dihydroxybiphenyl, hydroquinone, resorcinol, 2,6-dihydroxynaphthalene, 2,2-bis(4-hydroxyphenyl)propane and bis-(4-hydroxyphenyl)sulfone are preferable from the standpoint of easy availability.

In the production process of the present invention, given as examples of the aromatic hydroxycarboxylic acid are p-hydroxybenzoic acid (hereinafter, abbreviated as (A1) in some cases), m-hydroxybenzoic acid, 2-hydroxy-6-naphthoic acid (hereinafter, abbreviated as (A2) in some cases), 2-hydroxy-3-naphthoic acid, 1-hydroxy-4-naphthoic acid, 4-hydroxy-4'-carboxydiphenyl ether, 2,6-dichloro-p-hydroxybenzoic acid, 2-chloro-p-hydroxybenzoic acid, 2,6-difluoro-p-hydroxybenzoic acid, 4-hydroxy-4'-biphenylcarboxylic acid and the like. These can be used alone or in combination of two or more. Among them, p-hydroxybenzoic acid and 2-hydroxy-6-naphtoic acid are preferable from the standpoint of easy availability.

In the production process of the present invention, listed as the aromatic dicarboxylic acid are terephthalic acid (hereinafter, abbreviated as (B1) in some cases), isophthalic acid (hereinafter, abbreviated as (B2) in some cases), 2,6-naphthalenedicarboxylic acid (hereinafter, abbreviated as (B3) in some cases), 1,5-naphthalenedicarboxylic acid, 4,4'-biphenyldicarboxylic acid, methylterephthalic acid, methylisophthalic acid, diphenylether-4,4'-dicarboxylic acid, diphenyl sulfone-4,4'-dicarboxylic acid, diphenyl ketone-4,4'-dicarboxylic acid, 2,2'-diphenylpropane-4,4'-dicarboxylic acid and the like. These can be used alone or in combination of two or more. Among them, terephthalic acid, isophthalic acid and 2,6-naphthalnedicarboxylic acid are preferable from the standpoint of easy availability.

In the production process of the present invention, examples of the fatty anhydride having 4 or less carbon atoms include acetic anhydride, maleic anhydride, succinic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride and trifluoroacetic anhydride, and acetic anhydride is preferable from the standpoints of cost and handling property. Here, the term "having 4 or less carbon atoms" means the total number of carbon atoms constituting a fatty anhydride is 4 or less.

Examples of the fatty anhydride having over 4 carbon atoms include an anhydride of a mixed acid of acetic acid and propionic acid, propionic anhydride, butyric anhydride, isobutyric anhydride, valeric anhydride, pivalic anhydride, 2-ethylhexanoic anhydride, glutaric anhydride, β-bromopropionic anhydride and the like. Among them, combinations of acetic anhydride and propionic anhydride; acetic anhydride and butyric anhydride; and acetic anhydride and isobutyric anhydride are preferable.

The ration of a fatty anhydride having 4 or less carbon atoms to a fatty anhydride having over 4 carbon atoms is not particularly restricted, and it is preferable that the amount of a fatty anhydride having 4 or less carbon atoms is from 5 to 90% by weight based on the total amount of fatty anhydrides. When the amount of a fatty anhydride having 4 or less carbon atoms is over 90% by weight, an effect of improving flowability may be small, and when less than 5% by weight, cost and handling property may be unsatisfactory.

Among them, combinations containing 50 to 90% by weight of acetic anhydride and 10 to 50% by weight of propionic anhydride, butyric anhydride or isobutyric anhydride are preferable from the standpoint of easy availability.

The production process of the present invention provides a process comprising reacting an aromatic diol and/or aromatic hydroxycarboxylic acid with an aromatic dicarboxylic acid in the presence of a fatty anhydride having 4 or less carbon atoms and a fatty anhydride having over 4 carbon atoms (process A), and a process comprising reacting an aromatic diol and/or aromatic hydroxycarboxylic acid with a fatty anhydride having 4 or less carbon atoms and a fatty anhydride having over 4 carbon atoms before reacting with an aromatic dicarboxylic acid (process B).

In the production process of the present invention, it is preferable to charge raw materials so that the equivalency of carboxyl groups carried by an aromatic dicarboxylic acid and/or aromatic hydroxycarboxylic acid is from 0.8 to 1.2-fold based on the equivalency of phenolic hydroxyl groups carried by an aromatic diol and/or aromatic hydroxycarboxylic acid, in the whole charging raw material.

The total amount of fatty anhydrides is preferably from 1.0 to 1.2-fold based on the equivalency of phenolic hydroxyl groups carried by an aromatic diol and/or aromatic hydroxycarboxylic acid charged. When the total amount of fatty anhydrides is too small, the balance in acylation shifts to the fatty anhydride side, and raw materials sublimate in polymerization into a polyester to cause a tendency of clogging of the reaction system in some cases, and when too large, coloration of a polyester may be remarkable.

In the former stages of the above-mentioned processes A and B, the fatty anhydride charging process is not particularly restricted, and there are exemplified a process in which two or more fatty anhydrides are all charged before initiation of a reaction; a process in which one fatty anhydride is charged, then, a reaction is initiated, and remaining fatty anhydrides are charged during the reaction, and other processes.

For existence of a fatty anhydride having over 4 carbon atoms in the system, a fatty anhydride having over 4 carbon atoms can be allowed to be present by charging a fatty anhydride having 4 or less carbon atoms and a fatty acid corresponding to a fatty anhydride having over 4 carbon atoms and treating them by an acid anhydride exchange reaction. In this case, since a fatty anhydride having 4 or less carbon atoms is consumed by an anhydride exchange reaction with a fatty acid having over 4 carbon atoms, it is preferable to charge a fatty anhydride having 4 or less carbon atoms in an amount surplus by molar amount equivalent to that of the fatty acid having over 4 carbon atoms charged.

In the production process of the present invention, a by-produced fatty acid is usually distilled out of the reaction system for shifting equilibrium in effecting a transesterification reaction in the latter stage of the process A or B.

In this procedure, parts of raw materials vaporize or sublimate together with a fatty acid, and it is preferable to return parts of the fatty acid distilled to a reaction vessel by reflux, to cause return of these raw materials to the reaction vessel together with the fatty acid or in a condition dissolved in the fatty acid.

The production process of the present invention can be conducted by using a batchwise apparatus, continuous apparatus and the like, for example.

In the production process of the present invention, a catalyst can be used, if necessary, for the purpose of increasing the reaction speed. As the catalyst, there are listed germanium compounds such as germanium oxide and the like; tin compounds such as tin(II) oxalate, tin(II) acetate, dialkyl tin oxide, diaryl tin oxide and the like; titanium compounds such as titanium dioxide, titanium alkoxide, alkoxytitanium silic acid and the like; antimony compounds such as antimony trioxide and the like; metal salts of organic acids such as sodium acetate, potassium acetate, calcium acetate, zinc acetate, ferrous acetate and the like and the like; Lewis acids such as boron trifluoride, aluminum chloride and the like; amines; amides; imidazoles; inorganic acids such as hydrochloric acid, sulfuric acid and the like; and other compounds.

The aromatic liquid crystal polyester of the present invention obtained by the above-mentioned production process preferably contains at least 30 mol % of a repeating unit of the following general formula from the standpoint of balance of heat resistance and mechanical properties. The aromatic liquid crystal polyester of the present invention preferably has a weight-average molecular weight of from 10000 to 50000.

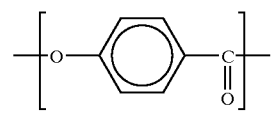

As the combination of repeating units of the aromatic liquid crystal polyester of the present invention, the following combinations (a) to (g) are preferable.

(a): a combination of a repeating unit based on the above-mentioned (A1), a repeating unit based on the above-mentioned (B1), or a repeating unit based on a mixture of the above-mentioned (B1) and (B2), and a repeating unit based on the above-mentioned (C1), (b): the combination according to the above-mentioned (a) in which a part or all of a repeating unit based on the above-mentioned (C1) is substituted by a repeating unit based on the above-mentioned (C2), (c): the combination according to the above-mentioned (a) in which a part or all of a repeating unit based on the above-mentioned (C1) is substituted by a repeating unit based on the above-mentioned (C3), (d): the combination according to the above-mentioned (a) in which a part or all of a repeating unit based on the above-mentioned (C1) is substituted by a repeating unit based on the above-mentioned (C4), (e): the combination according to the above-mentioned (a) in which a part or all of a repeating unit based on the above-mentioned (C1) is substituted by repeating units based on the above-mentioned (C4) and (C5), (f): the combination according to the above-mentioned (a) in which a part or all of a repeating unit based on the above-mentioned (A1) is substituted by a repeating unit based on the above-mentioned (A2), (g): the combination according to the above-mentioned (a) in which a part or all of a repeating unit based on the above-mentioned (B2) is substituted by a repeating unit based on the above-mentioned (B3).

EXAMPLES

The following examples and comparative examples will illustrate the present invention specifically, but do not limit the scope of the invention.

Example 1

Into a reaction vessel equipped with a stirring apparatus, torque meter, nitrogen gas introducing tube, thermometer and reflux condenser was charged 912 g (6.6 mol) of p-hydroxybenzoic acid, 410 g (2.2 mol) of 4,4'-dihydroxybiphenyl, 274 g (1.65 mol) of terephthalic acid, 91 g (0.55 mol) of isophthalic acid, 898 g (8.8 mol) of acetic anhydride and 430 g (3.3 mol) of propionic anhydride. After an atmosphere in the reaction vessel was purged sufficiently with a nitrogen gas, the charged materials were heated to 150° C. over 15 minutes under a nitrogen gas flow, and refluxed for 3 hours while maintaining the temperature.

Then, the reaction solution was heated up to 320° C. over 170 minutes while distilling off by-produced acetic acid and propionic acid distilled and unreacted acetic anhydride and propionic anhydride, and a point recognizing increase in torque was regarded as the reaction completion point, and the content was removed at this point. The resulted solid was cooled to room temperature, ground by a crude grinder, then, a polymerization reaction was progressed in a solid layer while maintaining the ground content at 285° C. for 3 hours under a nitrogen atmosphere.

The resulted resin was compound with 40% by weight of Milled Glass (EFH-7501) manufactured by Central Glass K.K. and they were mixed, and the mixture was granulated at 340° C. using a twin-screw extruder (PCM-30 manufactured by Ikegai Tekko K.K.). The resulted pellet was injection-molded using PS40E5ASE type injection molding machine manufactured by Nisshin Jushi Kokgyo K.K. at a cylinder temperature of 350° C. and a mold temperature of 130° C., and properties (tensile strength, deflection temperature under load, thin wall flow length) of the resin such as strength, heat resistance and the like were evaluated.

(1) Tensile Strength

It was measured according to ASTM D638 using ASTM No. 4 dumbbell.

(2) Deflection Temperature Under Load

It was measured under a load of 18.6 kg/cm$^2$ according to ASTM D648 using a specimen having a length of 127 mm, a width of 12.7 mm and a thickness of 6.4 mm.

(3) Thin Wall Flow Length

Resins are molded under the same conditions, and flow lengths are compared. This comparison is a criterion for evaluating molding processability of a resin.

The above-mentioned injection molding machines was used, and a mold for measuring thin wall flow length shown in FIG. 1 was used as a mold. The cylinder temperature was set at 350° C., and the mold temperature was set at 130° C., in this molding machine.

The above-mentioned pellet was fed to the above-mentioned molding machine and a melted resin was made. The melted resin injected through a nozzle at the tip of the cylinder of the molding methane passes through a sprue 1, runner 2 and gate 3 of the mold, and is filled inside of four cavities 4 shown in FIG. 1. Thereafter, this melted resin is cooled to solidify to give a molded article. This molded article is removed, and lengths (along flow direction) of resins filled in the above-mentioned four cavities were measured, respectively. The average value thereof was calculated as a thin wall flow length (mm). When the thin wall flow length value is larger, thin wall molding ability is more excellent. The results are shown in Table 1.

Examples 2 to 7

Comparative Example 1

The same procedure as in Example 1 was repeated except that as the charging fatty anhydrides, compounds shown in Table 1 were used in given amounts and reacted, then, ground by a crude grinding machine, and the ground materials were allowed to progress a polymerization reaction in a solid layer under a nitrogen atmosphere while maintaining for 3 hours at temperatures shown in Table 1 so that the flow initiation temperature of the resin corresponded to that in Example 1. The results are shown in Table 1.

Here, the flow initiation temperature means a temperature at which when a resin heated at a temperature raising rate of 4° C./min. is extruded through a nozzle having an internal diameter of 1 mm and a length of 10 mm under a load of 100 kgf/cm$^2$, the melt viscosity is 48000 poise.

TABLE 1

|  |  | Example 1 | Example 2 | Example 3 | Example 4 |
|---|---|---|---|---|---|
| Charging amount (mol) | PHBA | 6.6 | 6.6 | 6.6 | 6.6 |
|  | OHB | 2.2 | 2.2 | 2.2 | 2.2 |
|  | TP | 1.65 | 1.65 | 1.65 | 1.65 |
|  | IP | 0.55 | 0.55 | 0.55 | 0.55 |
|  | Acetic anhydride | 8.8 | 8.8 | 8.8 | 8.8 |
|  | Fatty anhydride | Propionic anhydride 3.3 | Butyric anhydride 3.3 | Isobutyric anhydride 3.3 | Pivalic anhydride 3.3 |
| Solid layer polymerization temperature (° C.) |  | 285 | 285 | 285 | 290 |
| Flow initiation temperature of resin (° C.) |  | 329 | 332 | 331 | 331 |
| Tensile strength (kgf/cm$^2$) |  | 1520 | 1460 | 1500 | 1480 |
| Deflection temperature under load (° C.) |  | 277 | 276 | 279 | 288 |
| Thin wall flow length (mm) |  | 16 | 17 | 17 | 17 |

TABLE 1-continued

|  |  | Example 5 | Example 6 | Example 7 | Comparative Example 1 |
|---|---|---|---|---|---|
| Charging amount (mol) | PHBA | 6.6 | 6.6 | 6.6 | 6.6 |
|  | OHB | 2.2 | 2.2 | 2.2 | 2.2 |
|  | TP | 1.65 | 1.65 | 1.65 | 1.65 |
|  | IP | 0.55 | 0.55 | 0.55 | 0.55 |
|  | Acetic anhydride | 8.8 | 9.9 | 6.6 | 12.1 |
|  | Fatty anhydride | Caproic anhydride 3.3 | Isobutyric anhydride 2.2 | Isobutyric anhydride 5.5 |  |
| Solid layer polymerization temperature (° C.) |  | 300 | 285 | 295 | 285 |
| Flow initiation temperature of resin (° C.) |  | 331 | 328 | 331 | 332 |
| Tensile strength (kgf/cm$^2$) |  | 1430 | 1480 | 1490 | 1490 |
| Deflection temperature under load (° C.) |  | 273 | 272 | 279 | 279 |
| Thin wall flow length (mm) |  | 19 | 17 | 17 | 14 |

PHBA: p-hydroxybenzoic acid
DHB: 4,4'-dihydroxybiphenyl
TP: terephthalic acid
IP: isophthalic acid The aromatic liquid crystal polyester obtained by the production process of the present invention shows an excellent thin wall molding ability while maintaining the characteristics of an aromatic liquid crystal polyester such as excellent heat resistance and strength, can be molded into even fine parts, and manifests an extreme utility as a highly heat-resistant material typically including electric and electronic parts.

What is claimed is:

1. A process for producing an aromatic liquid crystal polyester comprising reacting an aromatic diol, an aromatic hydroxycarboxylic acid, or an aromatic diol and aromatic hydroxycarboxylic acid with an aromatic dicarboxylic acid in the presence of a fatty anhydride having carbon atoms of 4 or less and a fatty anhydride having carbon atoms of over 4.

2. A process for producing an aromatic liquid crystal polyester comprising the steps of
reacting an aromatic diol, an aromatic hydroxycarboxylic acid, or an aromatic diol and aromatic hydroxycarboxylic acid with a fatty anhydride having carbon atoms of 4 or less and a fatty anhydride having carbon atoms of over 4, and
reacting with an aromatic dicarboxylic acid.

3. The process according to claim 1, wherein the fatty anhydride having carbon atoms of 4 or less is acetic anhydride and the amount of acetic anhydride is from 5 to 90% by weight based on the total amount of the fatty anhydrides.

4. An aromatic liquid crystal polyester produced by the process according to claim 1.

5. The process according to claim 2, wherein the fatty anhydride having carbon atoms of 4 or less is acetic anhydride and the amount of acetic anhydride is from 5 to 90% by weight based on the total amount of the fatty anhydrides.

6. An aromatic liquid crystal polyester produced by the process according to claim 2.

* * * * *